(12) United States Patent
Bjorstrom

(10) Patent No.: US 7,352,533 B1
(45) Date of Patent: Apr. 1, 2008

(54) HEAD SUSPENSION WITH POLYMER STIFFENER

(75) Inventor: Jacob D. Bjorstrom, Hutchinson, MN (US)

(73) Assignee: Hutchinson Technology Incorporated, Hutchinson, MN (US)

(*) Notice: Subject to any disclaimer, the term of this patent is extended or adjusted under 35 U.S.C. 154(b) by 544 days.

(21) Appl. No.: 10/872,252

(22) Filed: Jun. 18, 2004

(51) Int. Cl.
G11B 5/48 (2006.01)

(52) U.S. Cl. ..................................................... 360/244

(58) Field of Classification Search ............. 360/244.3, 360/244.2, 244.4, 244.5, 244.6, 244.7, 244.8, 360/245.9, 294.4, 244
See application file for complete search history.

(56) References Cited

U.S. PATENT DOCUMENTS 5,570,261 A * 10/1996 Frater et al. ............. 360/244.3
5,734,526 A * 3/1998 Symons .................... 360/244.3
6,351,351 B1 * 2/2002 Takasugi .................. 360/245.9
2002/0048124 A1 * 4/2002 Kuwajima et al. ........ 360/294.4
2004/0061975 A1 * 4/2004 Boutaghou et al. ....... 360/244.8
2004/0264056 A1 * 12/2004 Jang et al. ................ 360/245.9

FOREIGN PATENT DOCUMENTS

WO 2002/050835 6/2002
WO 2003/079355 9/2003

* cited by examiner

Primary Examiner—Tianjie Chen
(74) Attorney, Agent, or Firm—Faegre & Benson LLP

(57) ABSTRACT

A head suspension assembly including a stainless steel hinge member, an integrated lead flexure and a polymer stiffener member. The stainless steel hinge member includes a proximal mounting region, a beam region having a load point dimple, and a spring region between the mounting and beam regions. The integrated lead flexure is attached to the hinge member and has a slider bond pad engaged by the load point dimple. The stiffener member is molded onto the beam portion of the hinge member and attached by rivets extending through apertures in the hinge member.

26 Claims, 17 Drawing Sheets

HEAD SUSPENSION WITH POLYMER STIFFENER

FIELD OF THE INVENTION

The present invention relates generally to head suspension assemblies used in dynamic data storage devices such as rigid disk drives. More specifically, this invention is a head suspension assembly having a polymer stiffener attached to a metallic hinge member.

BACKGROUND OF THE INVENTION

Dynamic information storage devices such as rigid disk drives typically include a head for reading and/or writing data onto storage medium. An actuator mechanism is used to position the head at specific locations or tracks on the disk. Head suspensions are well known and used to support the head in proper orientation relative to the disk surface.

When used in disk drives, head suspension assemblies sometimes bend and twist in what are known as resonant modes. The frequencies at which these resonant modes occur are known as resonant frequencies. Resonant mode bending and twisting is undesirable since it can cause the read/write head to deviate from its desired position relative to a data track on the disk. Head suspension assemblies are therefore designed for optimum resonant mode performance. In general, head suspension assemblies are designed so as to have resonant frequencies that are higher than the frequencies the disk drive is expected to be subjected to in operation. The following U.S. patents describe suspension assemblies optimized for certain resonance performance characteristics.

| Inventor | U.S. Pat. No. |
|---|---|
| Wanlass | 4,992,898 |
| Zarouri et al. | 5,027,240 |
| Tangren | 5,850,319 |

Although stainless steel or other metals are most commonly used for the primary structural components in rigid disk drive suspension assemblies, the use of plastic or polymer components for this purpose is also known. Desirable properties of these materials include relatively light weight, relative stiffness, and efficiency of manufacturability. By way of example, the following U.S. patents describe suspension assemblies having polymer structural components:

| Inventor | U.S. Pat. No. |
|---|---|
| Oberg | 4,991,045 |
| Oberg, et al. | 5,185,683 |
| Brooks, Jr. et al. | 5,572,387 |
| Tucker, et al. | 5,654,851 |
| Berding, et al. | 5,796,554 |

There remains a continuing need for improved suspension assemblies. In particular, there is a need for disk drive head suspension assemblies having enhanced resonance performance characteristics. To be commercially viable, any such suspension assembly must be efficient to manufacture.

SUMMARY OF THE INVENTION

The present invention is a head suspension assembly that has high resonant frequencies and is capable of being efficiently manufactured. One embodiment of the invention includes a spring material hinge member, a polymer stiffener member and an integrated lead flexure. The hinge member includes a proximal mounting region, a beam region having a first load element, and a spring region between the mounting region and beam region. The stiffener member is attached to the beam region of the hinge member. The flexure includes a slider bond pad having a second load element attached to the beam region of the hinge member. The second load element is in cooperative engagement with the first load element to provide a load point for the slider bond pad.

Another embodiment of the invention includes a spring metal hinge member, electrical traces, insulating material and a polymer stiffener member. The hinge member includes a proximal mounting region, a beam region, a spring region between the mounting region and beam region, and a flexure region having a load point. The electrical traces extend from the flexure region over at least portions of the hinge member. The insulating material is located between the traces and adjacent portions of the hinge member. The stiffener member is attached to the beam region of the hinge member.

In yet another embodiment, a head suspension assembly includes an elongated metallic hinge member having a distal portion, a proximal portion, and a spring portion between the distal portion and the proximal portion. A non-metallic stiffener member is molded on a first surface of the hinge member and extends over the distal portion of the hinge member. The head suspension assembly also includes a dielectric layer forming at least a portion of a gimbal. The dielectric layer is formed on at least a portion of the second surface of the hinge member. The head suspension assembly further includes a conductor layer having a plurality of electrically conductive traces formed on the dielectric layer.

DETAILED DESCRIPTION OF THE PREFERRED EMBODIMENTS

Figure 1:
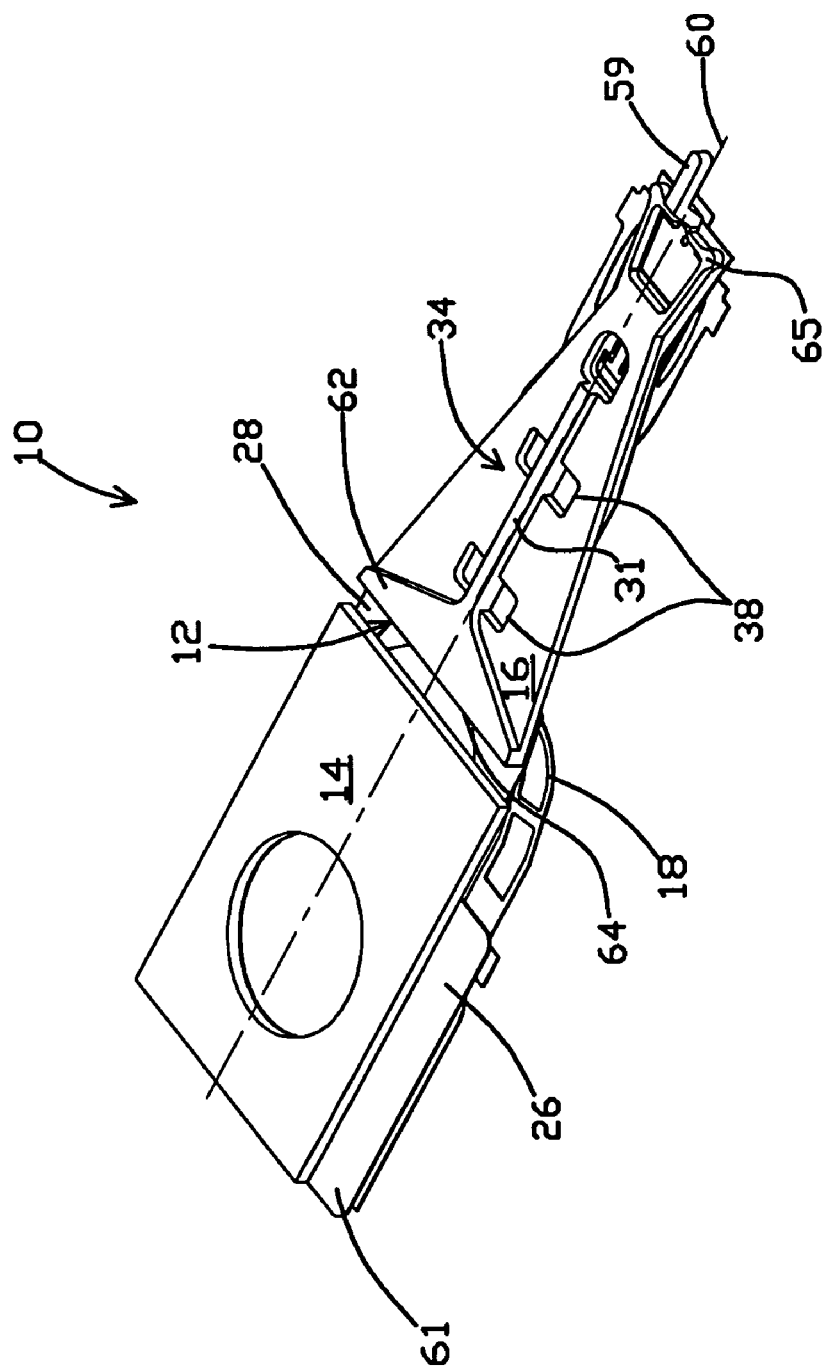
FIG. 1 is a perspective view of a first embodiment of a head suspension assembly in accordance with the present invention.
Figure 2:
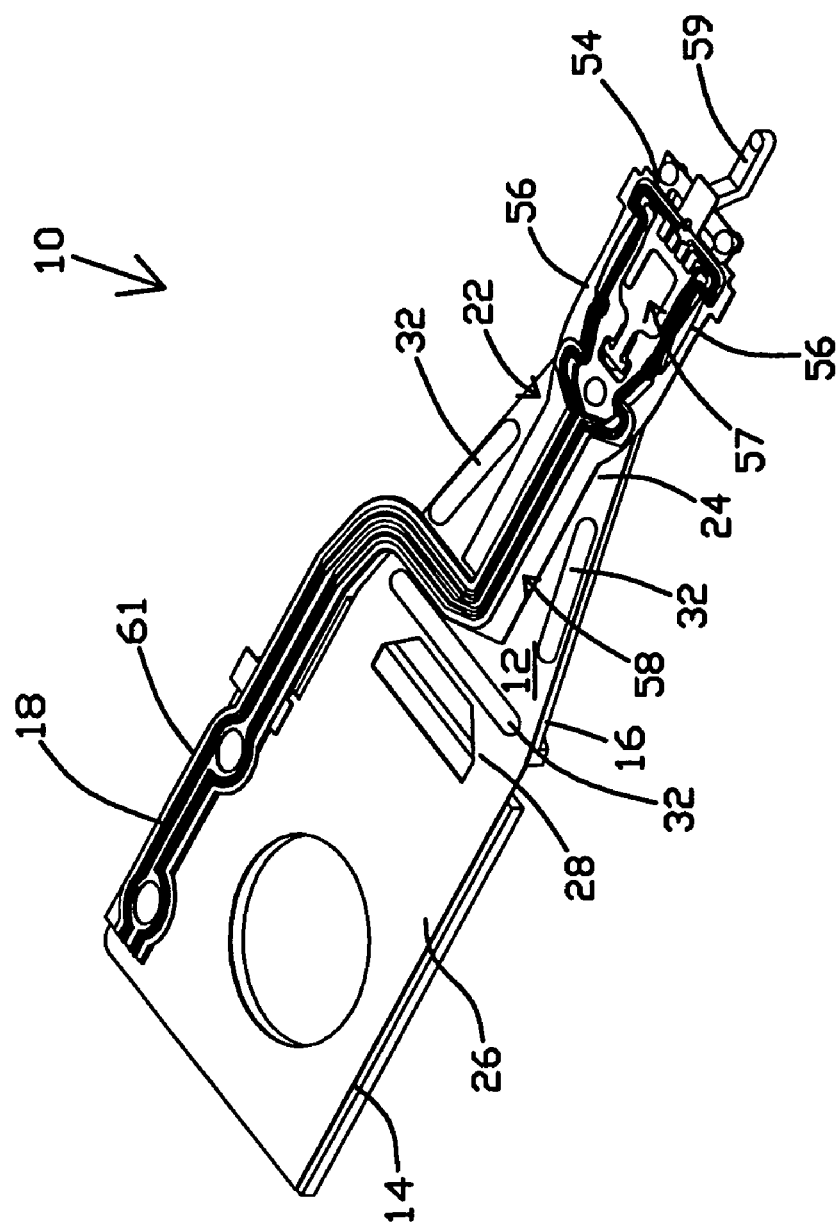
FIG. 2 is a perspective view of the head suspension assembly of FIG. 1, showing the side opposite that shown in FIG. 1.
Figure 3:
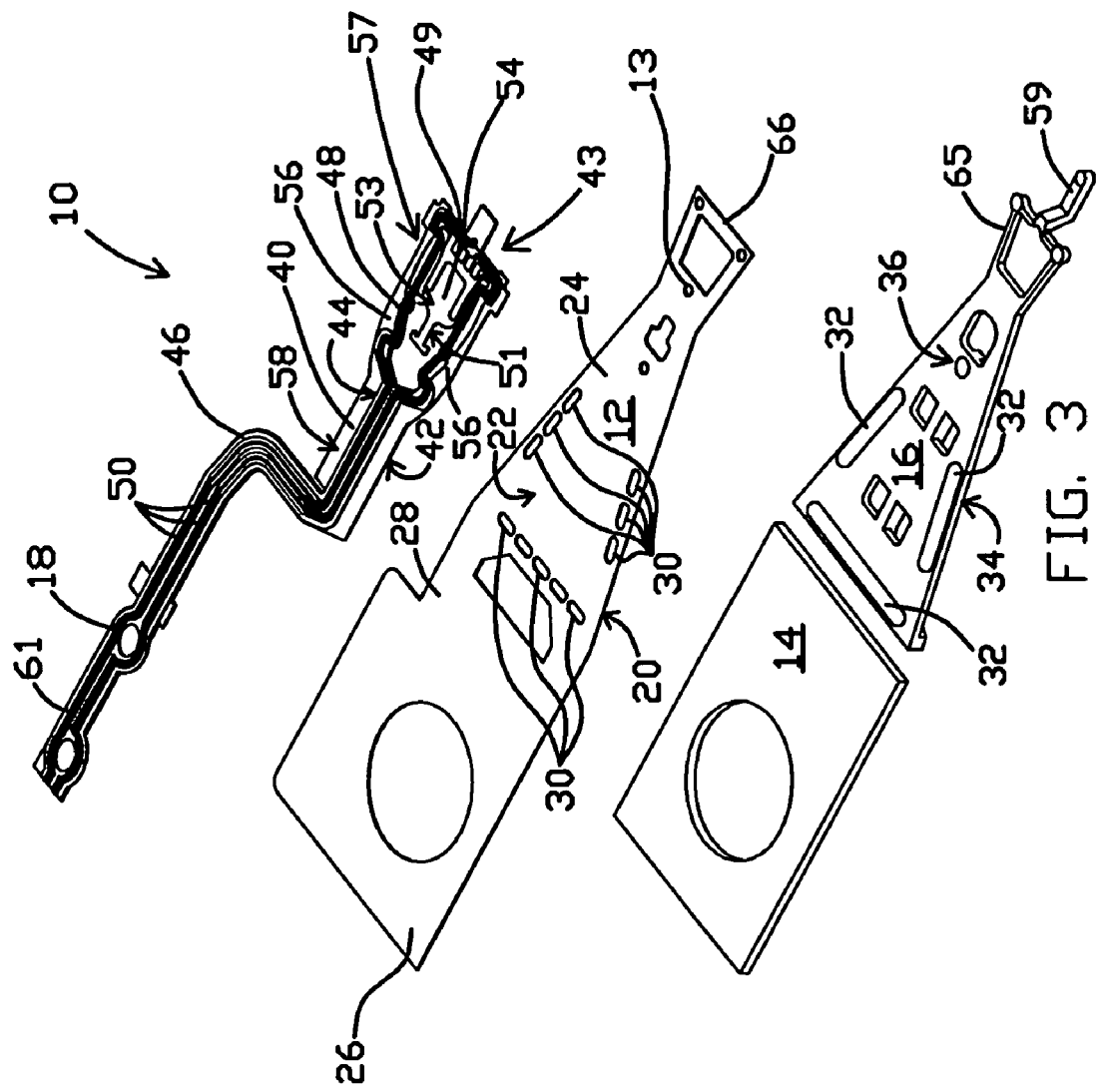
FIG. 3 is an exploded view of the head suspension assembly of FIG. 1.

Referring now to the figures, and in particular to FIGS. 1, 2, and 3, a head suspension assembly 10 in accordance with a first embodiment of the present invention is shown. The head suspension assembly 10 includes an elongated hinge member 12, a base plate 14, a stiffener member 16, and an integrated lead flexure 18. The elongated hinge member 12 is formed of spring material, such as stainless steel. The hinge member 12 has first and second opposed surfaces 20 and 22. The hinge member 12 also includes a flexure-mounting or distal portion 24, an actuator-mounting or proximal portion 26, and a radius of spring portion 28 between the distal portion 24 and the proximal portion 26. The spring portion 28 provides a spring force, sometimes called "gram load," to urge a head slider towards a disk (not shown). The hinge member 12 will typically have a generally uniform thickness, and is about 0.03 mm thick in one embodiment.

The base plate 14 is typically formed of metallic material, such as stainless steel. The base plate 14 can be mounted to first surface 20 of the hinge member 12 at the proximal portion 26 using adhesives, welding or other conventional or known techniques. Base plate 14 can be of any conventional or otherwise known design, and will typically include a boss tower (not shown).

The stiffener member 16 is formed of plastic or other polymer material. The stiffener member 16 has a first surface 34 and a second surface 36. The second surface 36 can be mounted to the first surface 20 of the hinge member 12 at the distal portion 24. Preferably, stiffener member 16 is formed by molding the member onto hinge member 12. As shown, the distal portion 24 of hinge member 12 includes one or more apertures 30. During an injection molding process, the material of the stiffener member 16 flows through the apertures 30 to form rivets 32. The rivets 32 extend through the apertures 30 and have heads to secure the stiffener member 16 to the distal portion 24 of the hinge member 12. Known injection molding processes can be used to manufacture the stiffener member 16 on the hinge member 12. Alternatively, the stiffener member can be separately manufactured and assembled onto the hinge member 12.

The stiffener member 16 extends over the distal portion 24 of the hinge member 12. The stiffener member 16 generally has a shape corresponding to a shape of the distal portion 24 of the hinge member 12. In the embodiment as shown in FIG. 1, the first surface 34 of the stiffener member 16 can include a center rail 31 extending along at least a portion of a central longitudinal axis 60 of the stiffener member. The stiffener member 16 can also include a proximal rail 62 extending along at least a portion of a proximal edge 64 of the stiffener member. In the illustrated embodiment, the proximal rail 62 extends along an entire portion of the proximal edge 64. Stiffener members having rails in accordance with the present invention can enhance the resonance characteristics of suspension assembly 10. The stiffener member 16 can also have one or more openings 38 extending therethrough. The openings 38 can be used for laser welding the flexure 18 to the second surface 22 of the hinge member 12.

The polymer material used for the stiffener member 16 can be much lighter than stainless steel. Accordingly, the stiffener members 16 can be formed thicker than stainless steel counterparts, and still have less mass. The stiffness and therefore resonance characteristics of the head suspension assembly 10 can thereby be enhanced. The stiffener member 16 is molded from polystyrene in one embodiment of this invention. Other polymers such as carbon-filled Lexan and SPS can also be used.

Preferred embodiments of the integrated lead flexure 18 are of known or otherwise conventional design and structure. Flexures 18 of these types are well known and can be fabricated from laminated sheets of material. A base or first layer 40 is typically formed of spring metal, such as stainless steel, and has first and second surfaces 42 and 44, respectively. The second layer 46 is formed of dielectric or insulating material and is located on the second surface 44 of the first layer 40. The third layer 48 of conductive material such as copper is located on the second layer 46 and formed into a plurality of electrical conductors 50. In one embodiment, the first layer 40 of the flexure 18 can be welded to the second surface 22 of the hinge member 12. Other attachment methods such as adhesive bonding can also be used.

The integrated lead flexure 18 includes a gimbal region 57 at its distal end 43, and a mounting region 58. The gimbal region 57 has a head bonding platform 49 connected to a lateral arm 54. Lateral arm 54 is connected to the mounting region 58 by a pair of side spring arms 56. The head bonding platform 49 is a tongue-shaped cantilever member extending proximally from the lateral arm 54 between side arms 56. The head bonding platform 49 has a first surface 51 and a second surface 53. The second surface 53 is adapted for attaching and supporting a head slider (not shown). Traces 50 extend from gimbal region 57, over the mounting region 58, and terminate at a tail 61 at the proximal end of the flexure 18. Portions of traces 50 that overlay the stainless steel layer 40 are generally separated from the stainless steel layer by insulating layer 44.

The hinge member 12 includes a first load element at its distal portion 24, while the flexure 18 includes a second load element in cooperative engagement with the first load element. In the illustrated embodiment, the first load element includes a load point dimple 13 formed out of the second surface 22 of the hinge member 12. The second load element includes a dimple engaging surface, which is a portion of the first surface 51 of the head bonding platform 49. The dimple 13 cooperatively engages the dimple engaging surface of head bonding platform 49 to form a load point about which the platform, and thereby the slider, can gimbal. In other embodiments (not shown) the second load element includes a load point dimple on the first surface 51 of the head bonding platform 49, and the first load element includes a dimple engaging surface, which is a portion of the second surface 22 of the hinge member 12.

In the illustrated embodiment, the stiffener member 16 includes a gimbal portion 65 that overlays a corresponding gimbal portion 66 on the hinge member 12. A head lift member 59 extends distally from the gimbal portion 65 of stiffener member 16. The head lift member 59 is non-metallic and created in the molding process. The head lift member 59 is stiff enough to support the head suspension assembly as it is elevated by a ramp (not shown) to the side of the disk (not shown) when incorporated into a disk drive. The head lift member 59 provides important advantages. For example, it provides a non-metallic, relatively low-friction surface for the ramp to contact, thereby reducing wear particles.

Figure 1A:
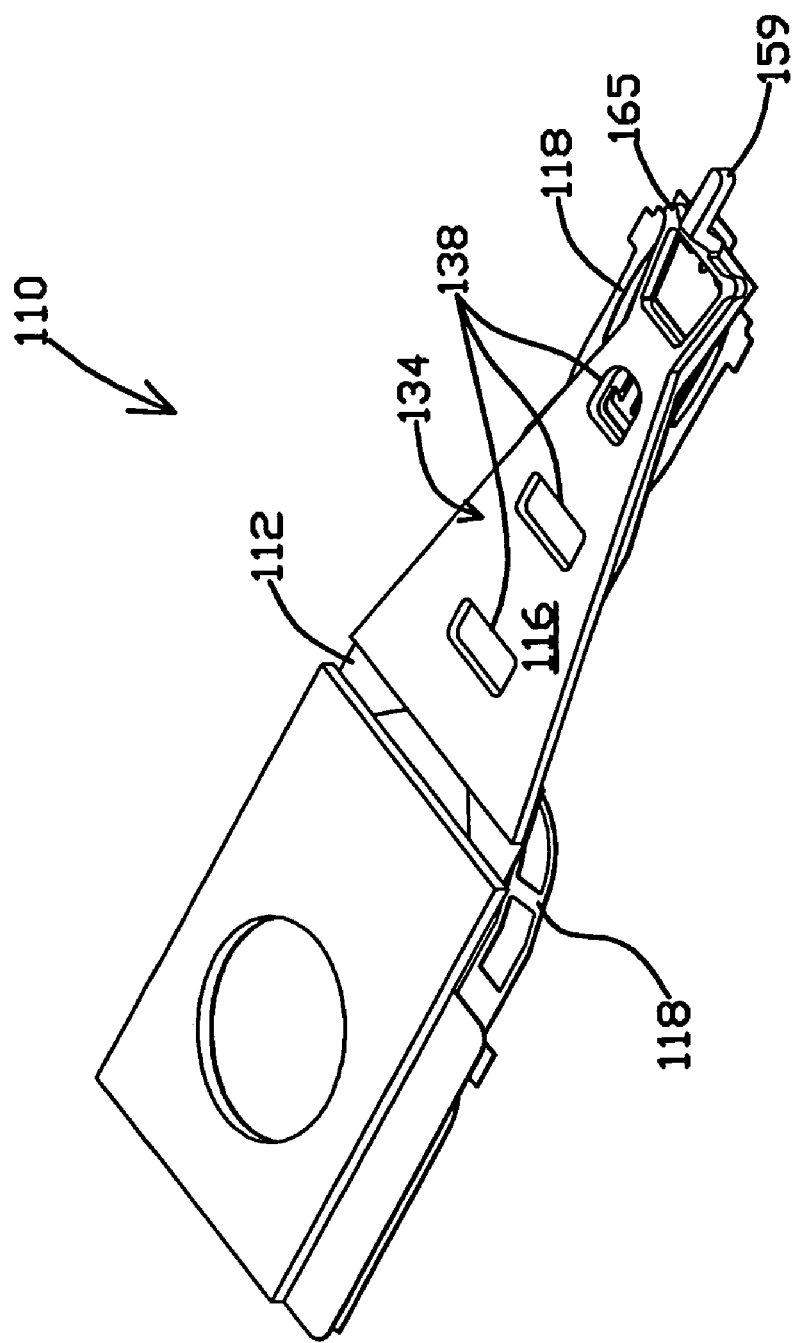
FIG. 1a is a perspective view of a second embodiment of a head suspension assembly in accordance with the present invention.

FIG. 1a is an illustration of a head suspension 110 in accordance with a second embodiment of the invention. Suspension assembly 110 is substantially similar to suspension assembly 10 described above, with the exception of the first surface 134 of the stiffener member 116. As shown, surface 134 of stiffener member 116 is generally planar. Openings 138 can be used for laser welding the integrated lead flexure 118 to the hinge member 112.

Figure 4:
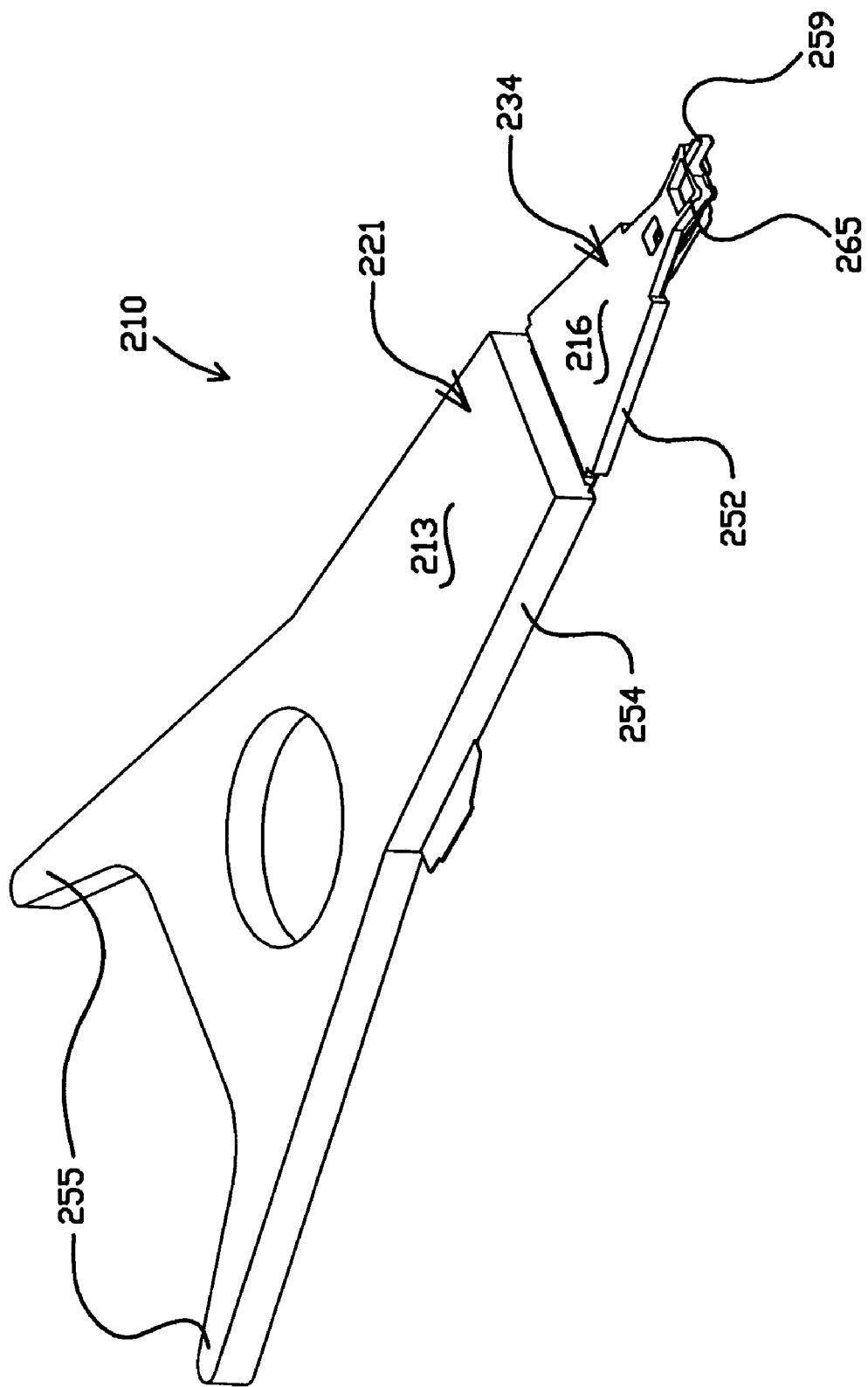
FIG. 4 is a perspective view of a third embodiment of a head suspension assembly in accordance with the present invention.
Figure 5:
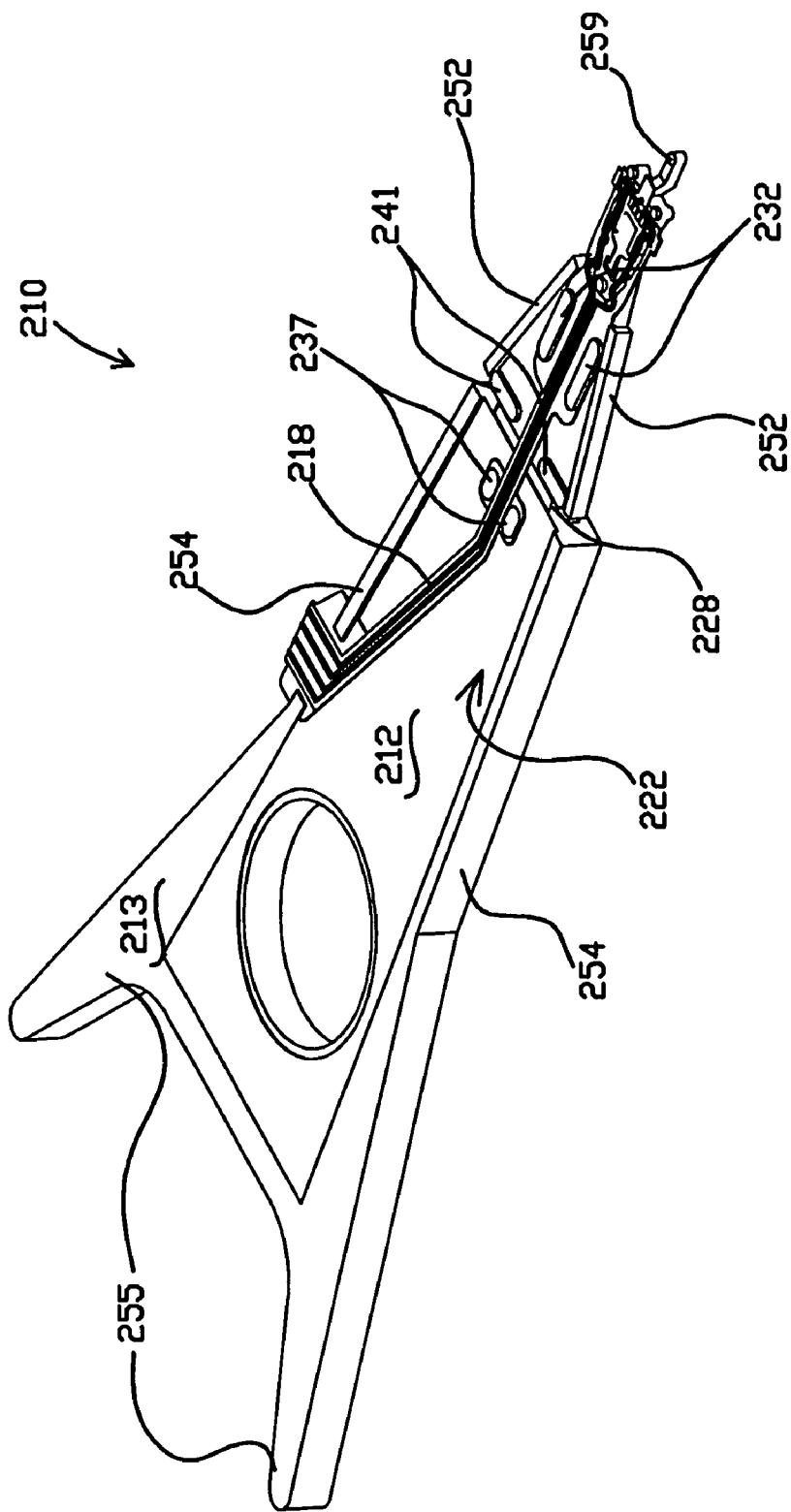
FIG. 5 is a perspective view of the head suspension assembly of FIG. 4, showing the side opposite that shown in FIG. 4.
Figure 6:
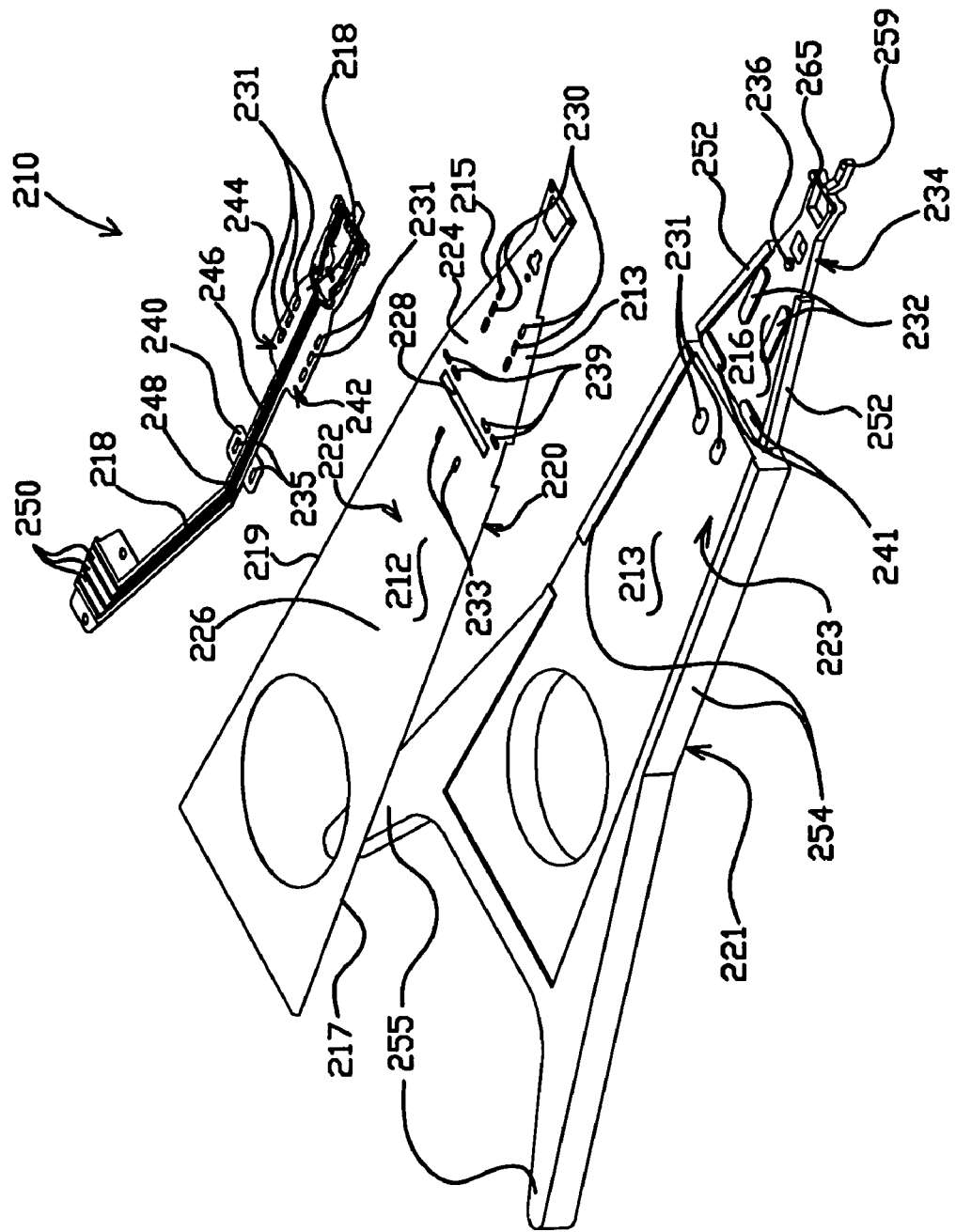
FIG. 6 is an exploded view of the head suspension assembly of FIG. 4.

FIGS. 4, 5, and 6 illustrate head suspension assembly 210, a third embodiment of the present invention. The head suspension assembly 210 includes an elongated hinge member 212, a polymer actuator arm 213, a polymer stiffener member 216, and an integrated lead flexure 218. The elongated hinge member 212 is formed of metallic material, such as stainless steel. The hinge member 212 has a first and second opposed surfaces 220 and 222. The hinge member 212 also includes a flexure-mounting or distal portion 224, an actuator-mounting or proximal portion 226, and a radius or spring portion 228 between the distal portion 224 and the proximal portion 226. The proximal portion 226 of the hinge member 112 is longer than the corresponding portion 26 of hinge member 12 described above, thereby enabling the portion 226 to form an extended portion of an actuator arm as described below.

The distal portion 224 includes a pair of formed side rails 215 extending along at least a portion of first and second lateral edges of the distal portion 224, respectively. The proximal portion 226 also includes a pair of side rails 217 and 219 extending along at least a portion of first and second lateral edges of the proximal portion 226, respectively. The side rails 215, 217, and 219 are formed to increase the stiffness of the hinge member 212. Other than these features, hinge member 212 can be similar to hinge member 12 described above in connection with suspension assembly 10.

Similar to the embodiment shown in FIGS. 1, 2, and 3, the integrated lead flexure 218 includes three layers. The first layer 240 is formed of metal such as stainless steel having first and second surfaces 242 and 244. The second layer 246 is formed of insulating material and is located on the second surface 244 of the first layer 240. The conductive material third layer 248 is formed into a plurality of electrical conductors 250.

The stiffener member 216 extends over the distal portion 224 of the hinge member 212. The stiffener member 216 has a first surface and a second surface 234 and 236, respectively. The second surface 236 can be formed and mounted to the first surface 220 of the hinge member 212 at the distal portion 224 through injection molding. In the illustrated embodiment, the polymer material of the stiffener member 216 flows through a plurality of apertures 230 in the distal portion 224 of the hinge member 212 and a plurality of apertures 231 in the flexure 218 during the injection molding process. The polymer material forms one or more rivets 232 on the second surface 244 of the first layer 240 of the flexure 218 adjacent to the apertures 231, so that both the stiffener member 216 and the flexure 218 are secured to the hinge member 212. The polymer material of the stiffener member 216 also flows through a plurality of apertures 239 in the distal portion 224 of the hinge member 212 during the injection molding process to form one or more rivets 241 extending through the hinge member 212.

In the illustrated embodiment of suspension assembly 210, the polymer material of the stiffener member 216 extends around the lateral edges of the distal portion 224 of the hinge member 212 to form a pair of rails 252. The rails 252 are formed to increase the stiffness of the stiffener member 216. Rails 252 can be formed while the stiffener member 216 is being molded on the hinge member 212, or during formation of the stiffener member as a separate component for attachment to the hinge member.

The polymer actuator arm 213 extends over the proximal portion 226 of the hinge member 212. The actuator arm 213 has a first surface and a second surface 221 and 223, respectively. The arm 213 can be formed and mounted to the hinge member 212 at the proximal portion 226 through injection molding. In the illustrated embodiment, the polymer material of the actuator arm 213 flows through a plurality of apertures 233 in the proximal portion 226 of the hinge member 212 and a plurality of apertures 235 in the first layer 240 of the flexure 218 during the injection molding process. The polymer material thereby forms one or more rivets 237 through the hinge member 212 and the flexure 218 so that both the actuator arm 213 and the flexure 218 are secured to the hinge member 212. Alternatively, arm 213 can be separately manufactured and mounted to the hinge member 212. In another embodiment (not shown) the actuator arm 213 and the stiffener member 216 can be attached to the hinge member 212 by rivets such as 237, 232 and 241, while the flexure 218 can be welded or adhered to the hinge member 212.

In the illustrated embodiment, the polymer material of the actuator arm 213 extends around the lateral edges of the hinge member 212 to form rails 254. The rails 254 enhance the stiffness of the actuator arm 213. In the illustrated embodiment of the actuator arm 213 also includes a pair of fingers 255 extending proximally therefrom for holding a voice coil.

The polymer actuator arm 213, in combination with the extended proximal portion 226 of the hinge member 212, eliminates the need for a metallic base plate and a metallic actuator arm attached to the base plate. Accordingly, this solution not only reduces complexity to the design of a disk drive assembly, but also reduces fabrication costs.

Figure 7:
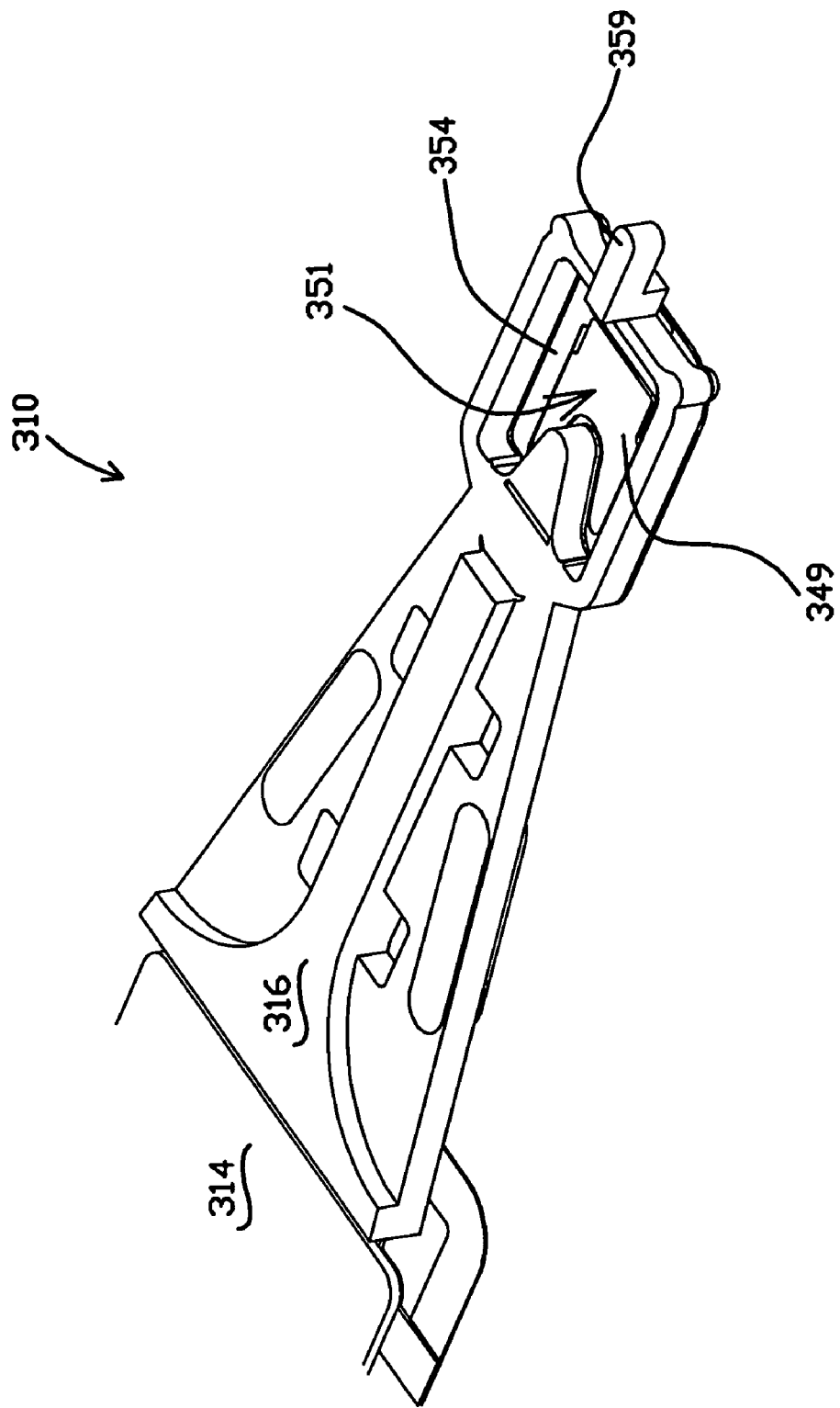
FIG. 7 is a perspective view of a fourth embodiment of a head suspension assembly in accordance with the present invention.
Figure 8:
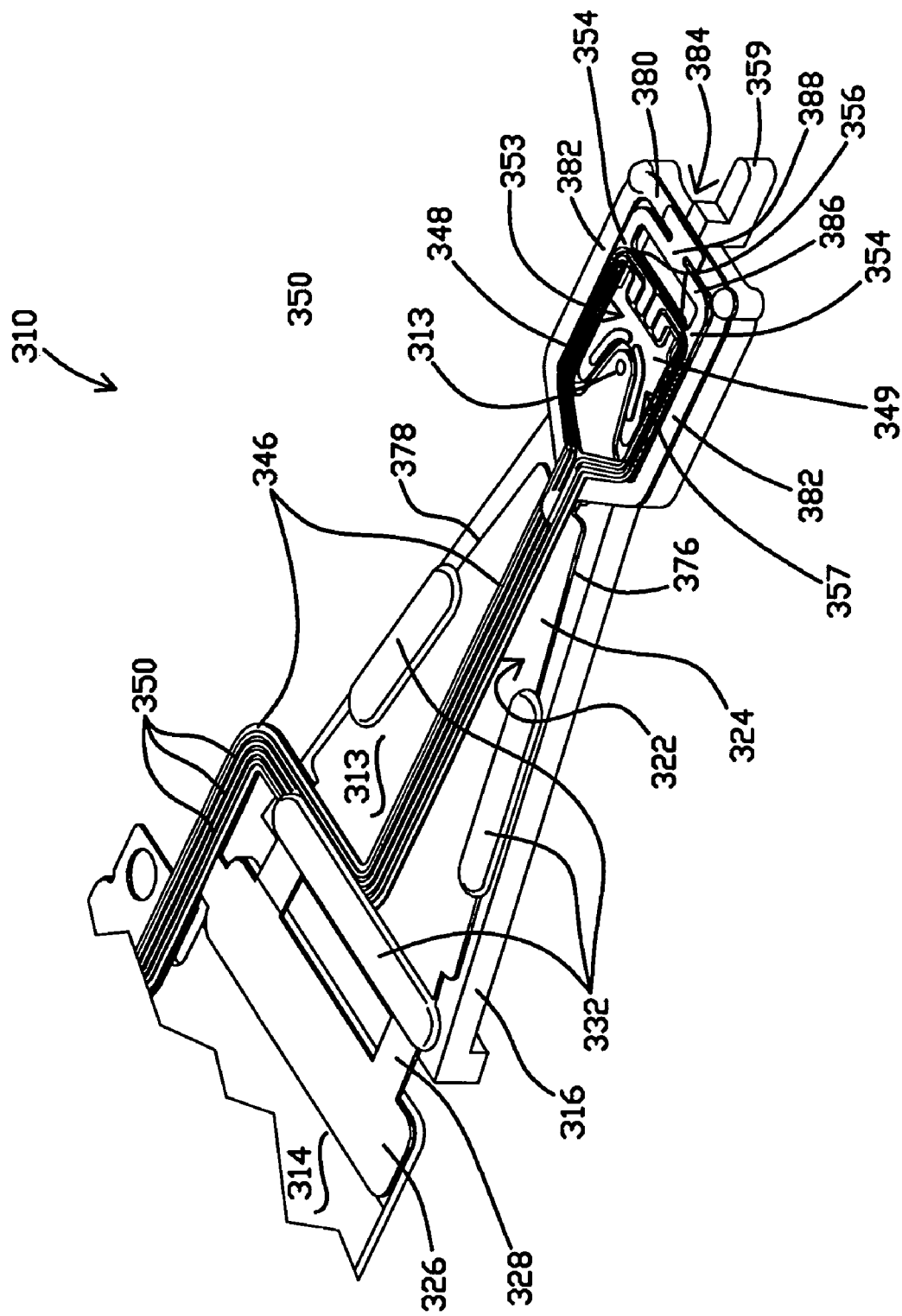
FIG. 8 is a perspective view of the head suspension assembly of FIG. 7, showing the side opposite that shown in FIG. 7.
Figure 9:
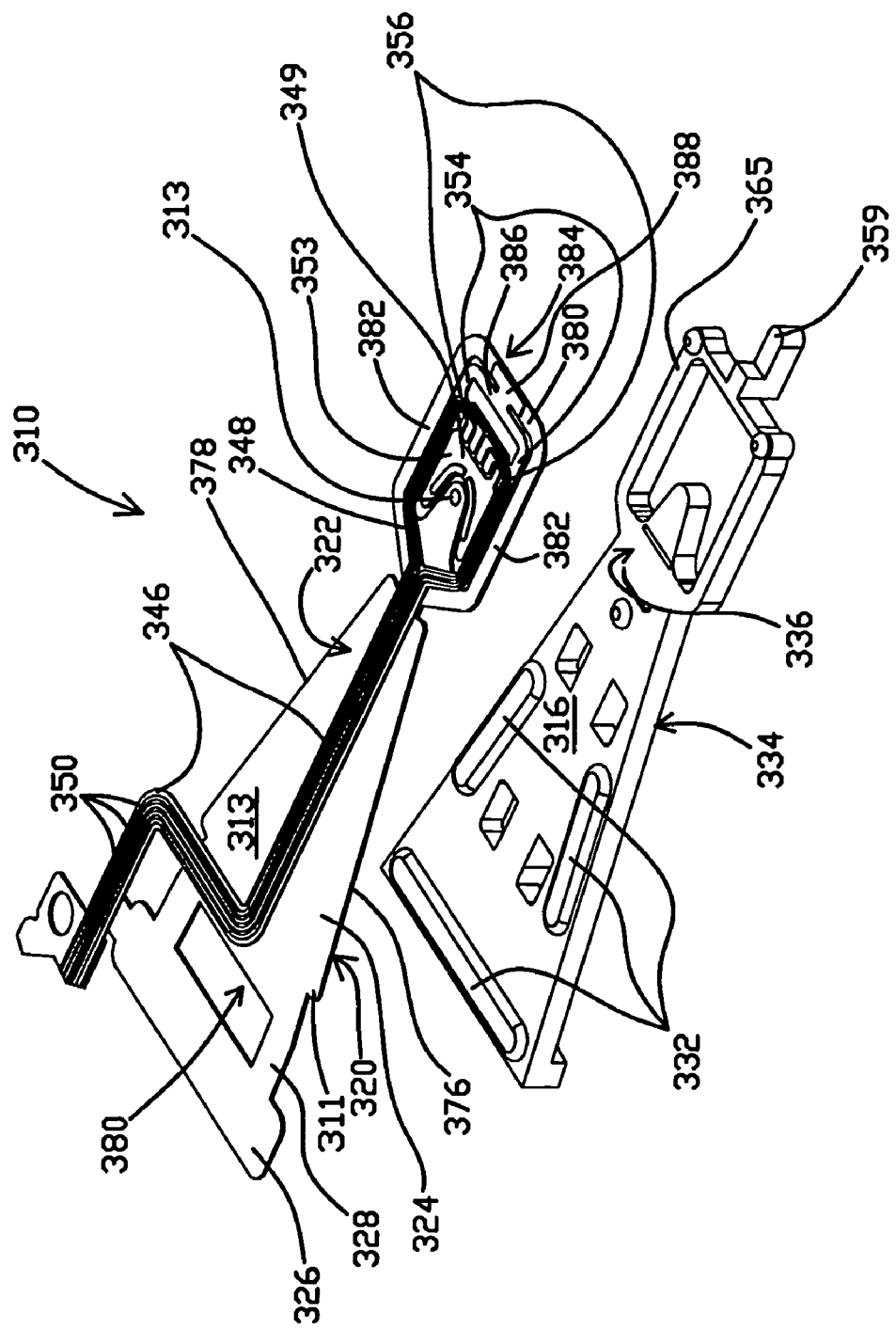
FIG. 9 is an exploded view of the head suspension assembly of FIG. 7.
Figure 10:
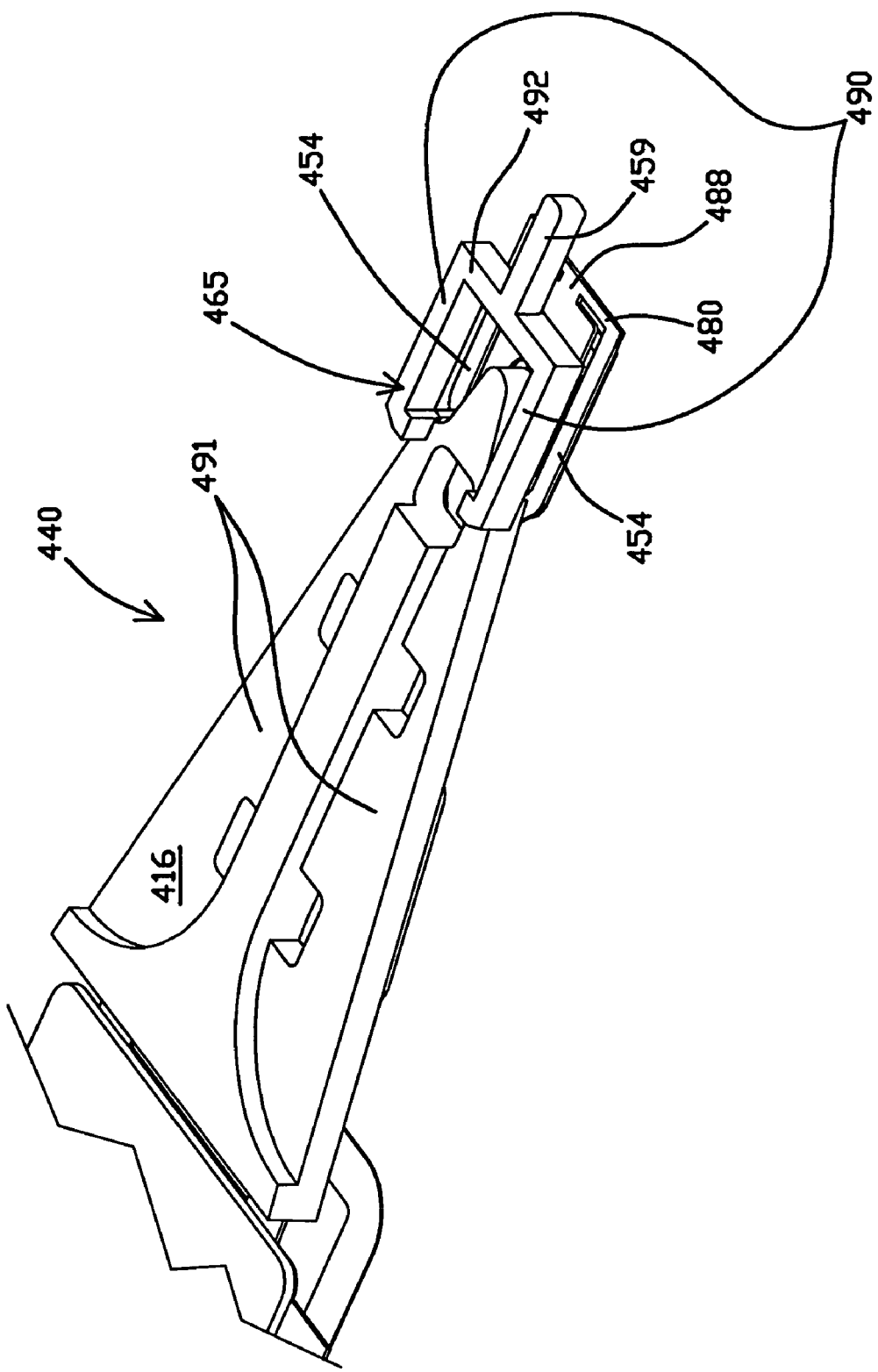
FIG. 10 is a perspective view of a fifth embodiment of a head suspension assembly in accordance with the present invention.
Figure 11:
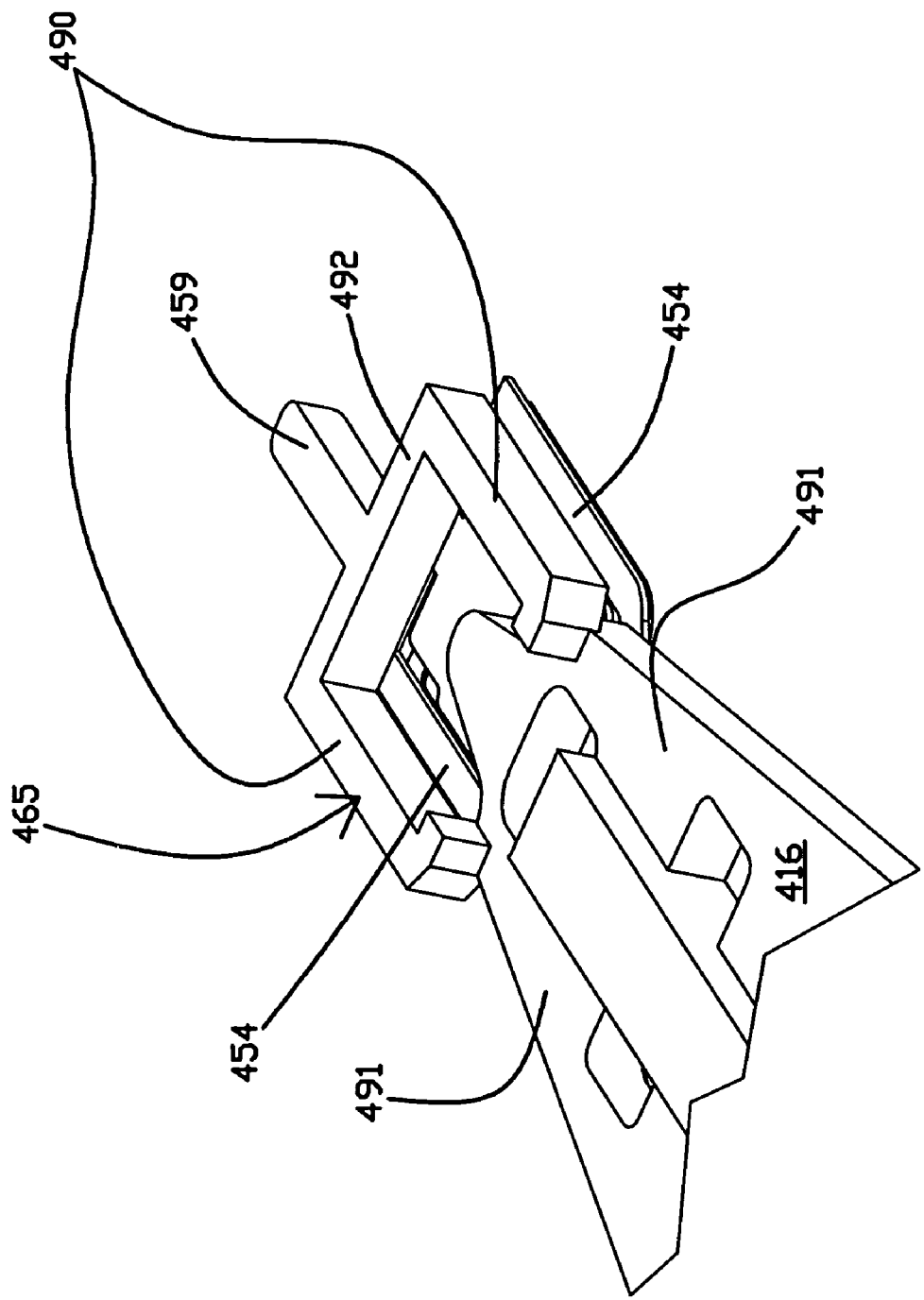
FIG. 11 is a detailed perspective view of the stiffener member and hinge member of the head suspension assembly of FIG. 10.
Figure 12:
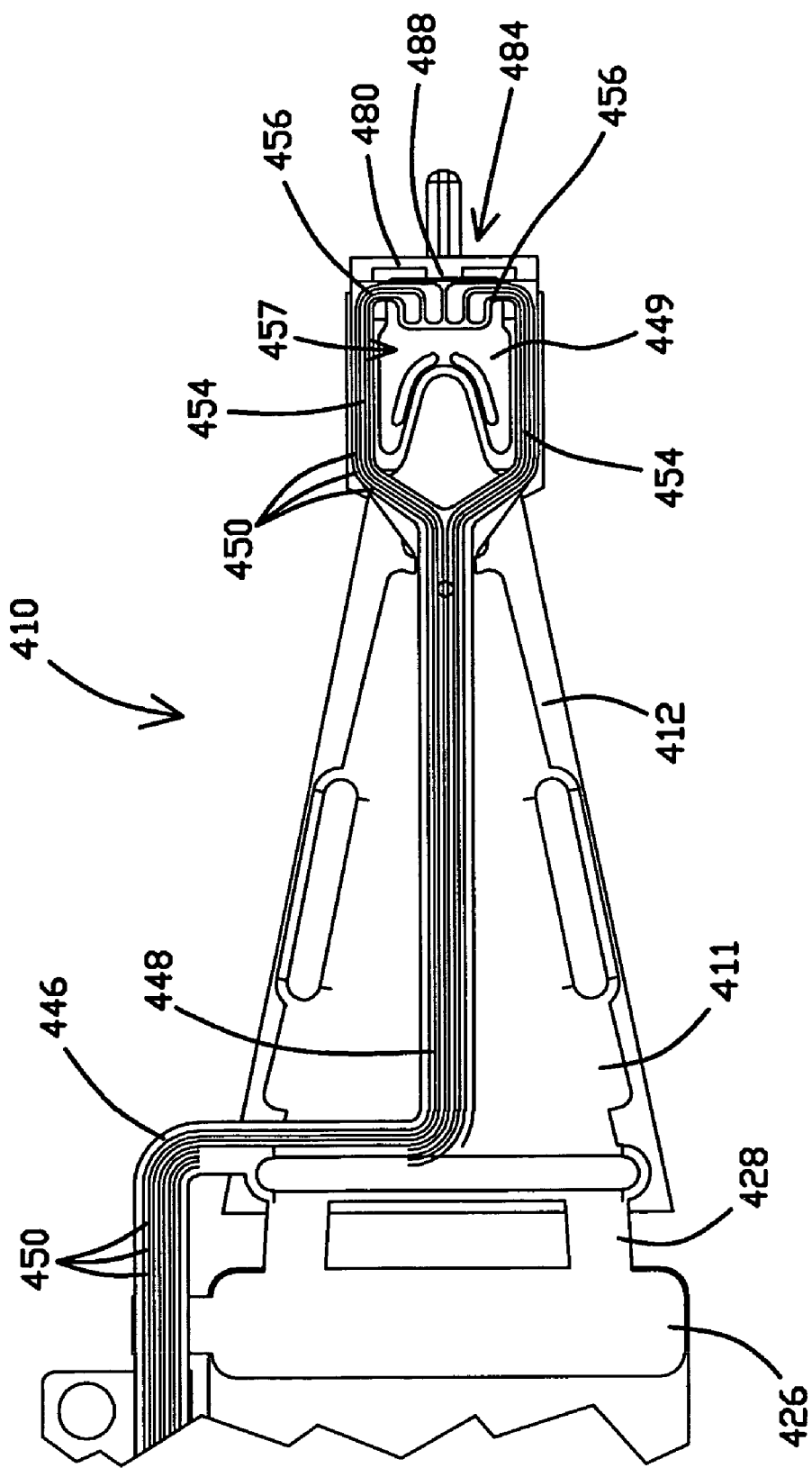
FIG. 12 is plan view of the head suspension assembly of FIG. 10.

FIGS. 7, 8, and 9 illustrate head suspension assembly 310, a fourth embodiment of the present invention. The head suspension assembly 310 includes a hinge/flexure 312, a base plate 314, and a stiffener member 316. The hinge/flexure 312 is formed from a laminated sheet of material including a layer 311 of spring material such as stainless steel, a copper or other conductive material layer 348, and a dielectric or insulating layer 346 between the stainless steel and copper layers. The formed hinge/flexure 312 has an arm-mounting or proximal portion 326, a hinge or spring portion 328, a beam portion 324, and a gimbal portion 357 on its distal end. Known chemical etching techniques can be used to fabricate hinge/flexure 312.

The base plate 314 can be stamped or otherwise formed of metallic material, such as stainless steel. The base plate 314 can be mounted to the stainless steel layer 311 at the proximal portion 326 of the hinge/flexure 312. Base plate 314 can be of any conventional or otherwise known design.

The stiffener member 316 is formed of polymer and extends over the beam portion 324 of the hinge/flexure 312. The stiffener member 316 generally has a shape corresponding to a shape of the beam portion 324 of the hinge/flexure 312. The stiffener member 316 has a first surface and a second surface 334 and 336, respectively. The second surface 336 can be formed and mounted to the first surface 320 of the hinge/flexure 312 at the distal portion 24 by injection molding. In this embodiment, and as perhaps best shown in FIG. 8, the polymer material of the stiffener member 316 flows over a portion of a first lateral edge 376 and a portion of a second lateral edge 378 at the beam portion 324 of the hinge/flexure 312 during the injection molding process. The polymer material also flows over the edge 380 at the proximal end of the beam portion 324. This overlaying polymer material forms one or more fasteners or rivets 332 to the second surface 322 of the hinge/flexure 312, so that the stiffener member 316 is secured to the beam portion 324 of the hinge/flexure 312. In other embodiments (not shown) the polymer material of the stiffener member 316 flows through a plurality of apertures formed in the beam portion 324 of the hinge/flexure 312 during the injection molding process to secure the stiffener member to the hinge/flexure.

As noted above, the flexure of gimbal portion 357 and conductive traces 350 are formed from the laminated material from which the other portions of hinge/flexure 312 are formed. In this embodiment, the gimbal portion 357 includes a head bonding platform 349 connected to a pair of lateral arms 354 by a pair of transverse arms 356. The lateral arms 354 and the transverse arms 356 are formed from the dielectric layer 346 and the conductive material layer 348. The head bonding platform 349 has a first surface 351 and a second surface 353. The head bonding platform 349 is formed of the stainless steel of layer 311. The second surface 353 is adapted for attaching and supporting a head slider (not shown). The conductive traces 350 are routed along the lateral arms 354 and transverse arms 356 for electrical connection to the head slider (not shown).

The stainless steel layer 311 of hinge/flexure 312 includes a pair of arms 382 and a transverse bridge 380 connecting the arms 382 at the distal end 384 thereof. The arms 382 extend around the lateral sides of the gimbal portion 357. The dielectric layer 346 includes a dielectric transverse bridge 386 connecting the lateral arms 354. The transverse bridge 380 and the dielectric transverse bridge 386 are connected together at a tab 388 formed of a portion of the dielectric layer 346 to provide lateral stiffness. Portions of gimbal portion 357 of hinge/flexure 312 such as arms 382 and/or bridge 380 can be secured to portions of stiffener member 316 by rivets or over molding processes of the type described above.

The gimbal portion 357 of hinge/flexure 312 includes a first load element, while the head slider (not shown) includes a second load element in cooperative engagement with the first load element. In the illustrated embodiment, the first load element includes a load point dimple 313 formed in the stainless steel layer 311 of hinge/flexure 312 at a location adjacent to the head bonding platform 349. The second load element includes a dimple engaging surface, which is a portion of a rear surface of the head slider (not shown). The dimple 313 cooperatively engages with the dimple engaging surface to form a load point about which the slider can gimbal. In alternative embodiments (not shown), the second load element includes a load point dimple formed on the rear surface of the head slider, and the first load element is a surface on the stainless steel layer 311 of the hinge/flexure 312. Integrating the gimbal portion 357 into the other portions of hinge/flexure 312 offers a number of advantages including reductions in mass and manufacturing efficiencies.

FIGS. 10, 11, 12, and 13, are illustrations of a head suspension assembly 410 in accordance with another embodiment of the present invention. The head suspension assembly 410 is similar to the head suspension assembly 310 described in connection with FIGS. 7, 8, and 9, but has some differences primarily in the stiffener member 416 and gimbal portion 457. In this embodiment, the suspension assembly 410 includes a gimbal region 457 having a head bonding platform 449 connected to a pair of lateral arms 454 by a pair of transverse arms 456. The lateral arms 454 are formed from the stainless steel layer 411 of hinge/flexure 412, a dielectric layer 446, and a conductive material layer 448 formed to have plurality of electrically conductive traces 450. The transverse arms 456 are formed from the dielectric layer 446 and the conductive material layer 448. The head bonding platform 449 has a first surface 451 and a second surface 453. The head bonding platform 449 is formed of the stainless steel layer 411 of hinge/flexure 412. The second surface 453 is adapted for attaching and supporting a head slider (not shown). The conductive traces 450 are routed along the lateral arms 454 and transverse arms 456 for electrical connection to the head slider (not shown). The gimbal portion 457 of hinge/flexure 412 includes a transverse bridge 480 connecting the lateral arms 454 at a distal end 484 thereof. The transverse bridge 480 and the head bonding platform 449 are connected together at a tab 488. The bridge 480 and tab 488 are formed from the stainless steel layer 411.

Figure 13:
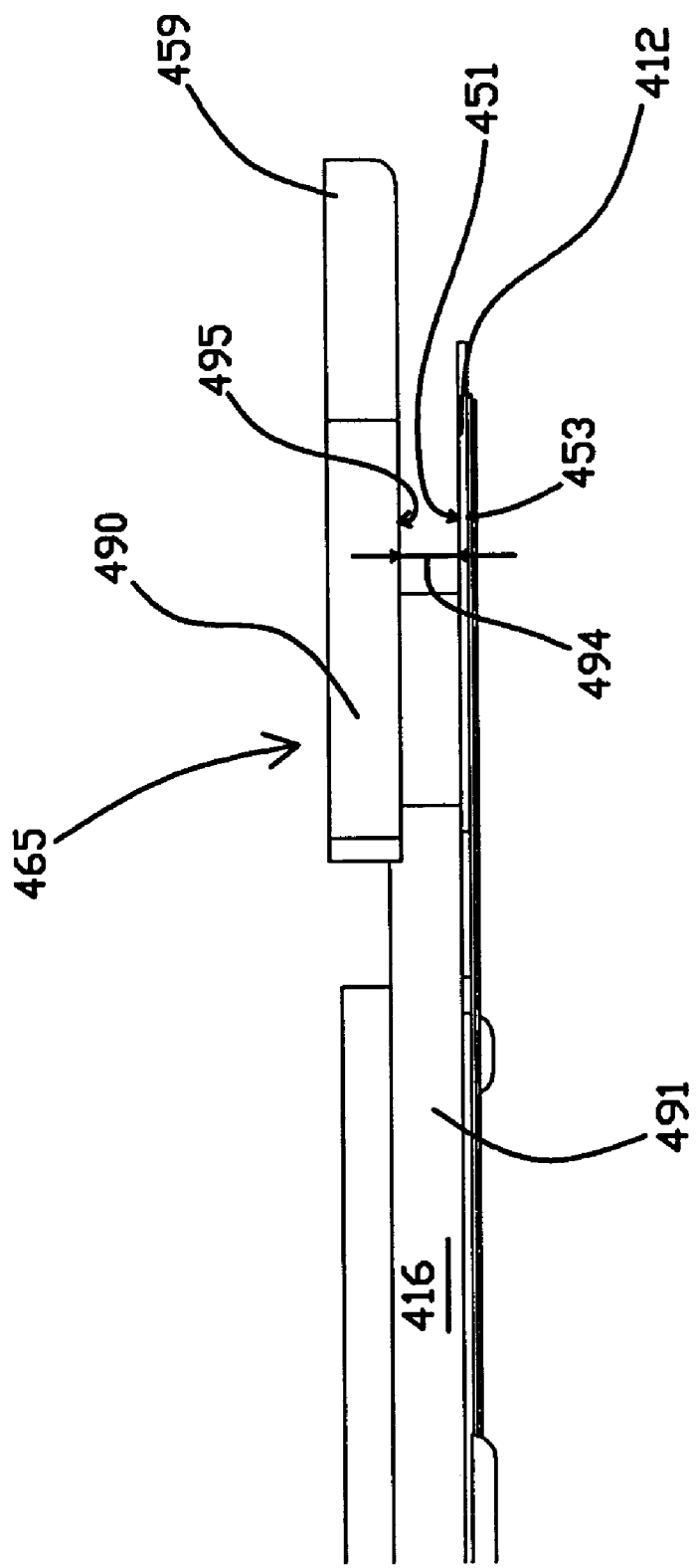
FIG. 13 is a detailed side view of the stiffener member and the hinge member of the head suspension assembly of FIG. 10.

The gimbal portion 465 of stiffener member 416 includes a pair of lateral members 490 connected at their distal ends by a transverse bridge 492. Head lift member 459 extends distally from bridge 492. As perhaps best shown in FIGS. 11 and 13, lateral members 490, bridge 492 and head lift member 459 are spaced from the gimbal portion 457 of hinge/flexure 412 by a distance 494 (FIG. 13).

Figure 14:
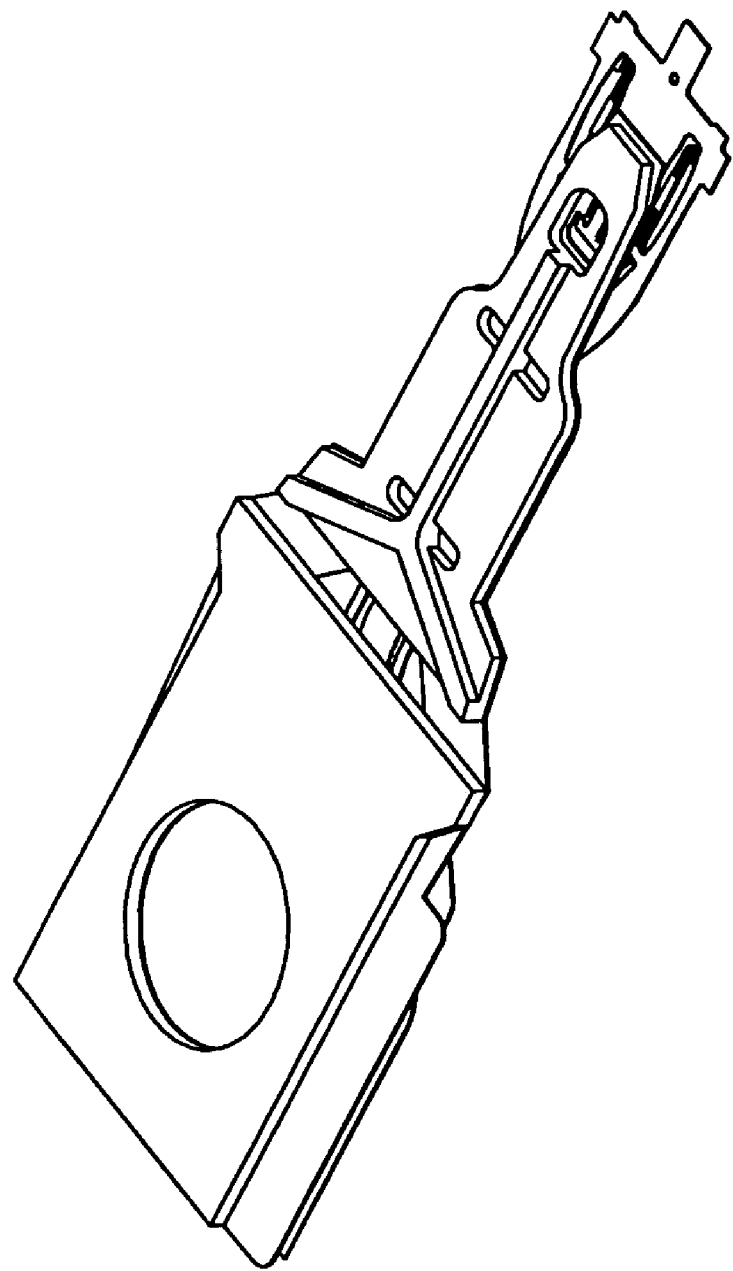
FIG. 14 is a perspective view of a portion of another embodiment of a hinge member.
Figure 15:
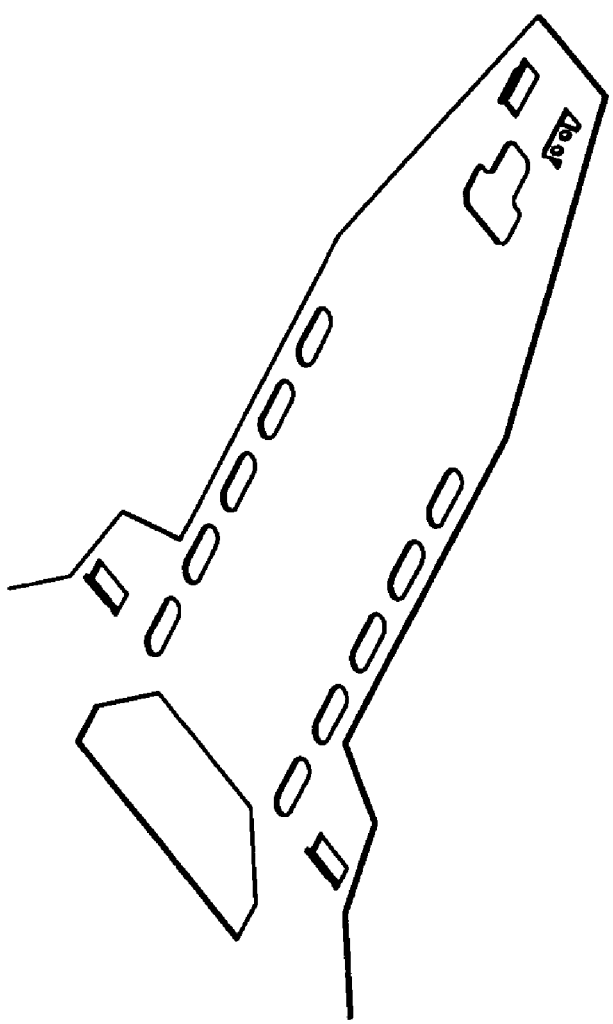
FIG. 15 is a detailed perspective view of a portion of the hinge member shown in FIG. 14, showing the flange attachment structure.
Figure 16:
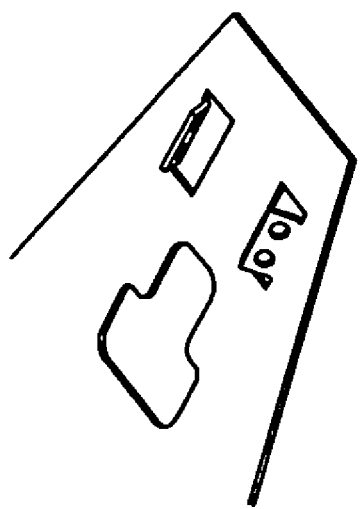
FIG. 16 is a perspective view of another embodiment of a head suspension assembly in accordance with the present invention including the hinge member shown in FIGS. 14 and 15.

FIG. 14 is an illustration of a hinge member 512 in accordance with yet another embodiment of the invention. As shown, hinge member 512 includes attachment tabs or flanges 529 that extend out of the major plane of the hinge member. Conventional forming processes can be used to extend the flanges 529 out of the plane of hinge member 512. Although only two flanges 529 are shown at the distal end of hinge member 512, more or fewer flanges can be formed on the hinge member, and they can formed at other locations. Other out-of-plane offset forms such as rails can also be used as functionally equivalent alternatives to the flanges 529. FIG. 15 is a detailed illustration of the portion of hinge member 512 with flanges 529. As shown, each flange 529 can have one or more apertures 527 for enhancing the engagement of the hinge member to a stiffener member 516 (FIG. 16). FIG. 16 illustrates a head suspension assembly 510 including a stiffener member 516 attached to hinge member 512. In the illustrated embodiment, the flanges 529 do not extend through the thickness of the stiffener member 516. As shown in FIG. 16, the flanges 529 are located on hinge member 512 at a position where they will engage the hinge member adjacent to the head bending platform 549 of the integrated lead flexure 518.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications, variations, and different combinations thereof may be made without departing from the spirit or scope of the invention.

In particular, although described in connection with wireless suspensions having a spring metal flexure (e.g., the flexure is formed from a three layer laminate), the invention can also be used in connection with other types of devices such as flexible circuit or flex cable flexures (also known as "flex on" or "FSA" flexures).

What is claimed is:

1. A head suspension assembly, including:
a spring material hinge member including a proximal mounting region, a beam region having a first load element, and a spring region between the mounting region and beam region;
a polymer stiffener member attached to the beam region of the hinge member; and
an integrated lead flexure including a slider bond pad having a second load element attached to the beam region of the hinge member, the second load element in cooperative engagement with the first load element to provide a load point for the slider bond pad.

2. The head suspension assembly of claim 1 wherein the stiffener member is a molded member.

3. The head suspension assembly of claim 1 wherein:
the hinge member includes one or more apertures; and
the stiffener member includes rivets extending through the apertures in the hinge member to attach the stiffener member to the hinge member.

4. The head suspension assembly of claim 3 wherein:
the integrated lead flexure includes one or more apertures; and
the stiffener member includes rivets extending through the apertures in the flexure to attach the flexure to the hinge member.

5. The head suspension assembly of claim 3 and further including welds to attach the flexure to the hinge member.

6. The head suspension assembly of claim 1 wherein the first load element includes a formed dimple in the hinge member.

7. The head suspension assembly of claim 1 wherein the stiffener member further includes a head lift.

8. The head suspension assembly of claim 1 wherein the stiffener member includes one or more rails.

9. The head suspension assembly of claim 1 wherein the stiffener member extends around one or more edges of the hinge member to attach the stiffener member to the hinge member.

10. The head suspension assembly of claim 1 and further including a polymer actuator arm attached to the proximal mounting region of the hinge member.

11. The head suspension assembly of claim 10 wherein:
the integrated lead flexure includes a tail having one or more apertures; and
the polymer actuator arm includes rivets extending through the apertures in the tail of the flexure to attach the flexure to the actuator arm.

12. The head suspension assembly of claim 1 wherein:
the integrated lead flexure includes a gimbal; and
the stiffener member includes a gimbal portion extending over at least a portion of the gimbal of the flexure.

13. The head suspension assembly of claim 1 wherein the hinge member is a one-piece member.

14. The head suspension assembly of claim 1 wherein:
the hinge member includes one or more out-of-plane offsets; and
the stiffener member is attached to the out-of-plane offsets.

15. The head suspension assembly of claim 14 wherein:
the out-of-plane offsets include apertures; and
the stiffener member extends into the apertures.

16. A head suspension assembly, including:
a spring metal hinge member having one or more apertures and including a proximal mounting region, a beam region, a spring region between the mounting region and beam region, and a flexure region having a load point;
electrical traces extending from the flexure region over at least portions of the hinge member;
insulating material between the traces and adjacent portions of the hinge member; and;
a polymer stiffener member attached to the beam region of the hinge members including rivets extending through the apertures in the hinge member to attach the stiffener member to the hinge member.

17. The head suspension assembly of claim 16 wherein the hinge member, electrical traces and insulating material comprise a hinge/flexure formed from a laminated sheet of material.

18. The head suspension assembly of claim 16 wherein stiffener member is a molded member.

19. The head suspension assembly of claim 16 wherein the load point includes a formed dimple.

20. The head suspension assembly of claim 16 wherein the stiffener member includes one or more rails.

21. The head suspension assembly of claim 16 wherein the stiffener member extends around one or more edges of the hinge member to attach the stiffener member to the hinge member.

22. The head suspension assembly of claim 16 and further including a polymer actuator arm attached to the proximal mounting region of the hinge member.

23. The head suspension assembly of claim 16 wherein:
the hinge member includes one or more out-of-plane offsets; and
the stiffener member is attached to the out-of-plane offsets.

24. The head suspension assembly of claim 23 wherein:
the out-of-plane offsets include apertures; and
the stiffener member extends into the apertures.

25. A head suspension assembly, including:
a spring metal hinge member including a proximal mounting region, a beam region, a spring region between the mounting region and beam region, and a flexure region having a load point;
electrical traces extending from the flexure region over at least portions of the hinge member;
insulating material between the traces and adjacent portions of the hinge member; and;
a polymer stiffener member including a head lift attached to the beam region of the hinge member.

26. A head suspension assembly, including:
a spring metal hinge member including a proximal mounting region, a beam region, a spring region between the mounting region and beam region, and a flexure region having a load point;
electrical traces extending from the flexure region over at least portions of the hinge member;
insulating material between the traces and adjacent portions of the hinge member; and;
a polymer stiffener member attached to the beam region of the hinge member, the stiffener member including a gimbal portion extending over at least a portion of the flexure region of the hinge member.

* * * * *